(12) United States Patent
Ke et al.

(10) Patent No.: US 7,270,180 B2
(45) Date of Patent: Sep. 18, 2007

(54) SCALING INHIBITORS AND METHOD FOR USING THE SAME IN HIGH DENSITY BRINES

(75) Inventors: Mingjie Ke, Spring, TX (US); Qi Qu, Spring, TX (US)

(73) Assignee: BJ Services Company, Houston, TX (US)

( * ) Notice: Subject to any disclaimer, the term of this patent is extended or adjusted under 35 U.S.C. 154(b) by 0 days.

(21) Appl. No.: 11/649,492

(22) Filed: Jan. 3, 2007

(65) Prior Publication Data
US 2007/0175635 A1 Aug. 2, 2007

Related U.S. Application Data

(63) Continuation of application No. 10/671,156, filed on Sep. 25, 2003, now Pat. No. 7,159,655.

(51) Int. Cl.
*E21B 37/00* (2006.01)
*E21B 43/26* (2006.01)
*E21B 43/27* (2006.01)

(52) U.S. Cl. ............ 166/279; 166/307; 166/308.2; 166/310; 166/312; 507/222; 507/224; 507/225; 507/927

(58) Field of Classification Search ............ 166/279, 166/300, 307, 308.2, 310, 312, 371; 507/222, 507/223, 224, 225, 927
See application file for complete search history.

(56) References Cited

U.S. PATENT DOCUMENTS

| 4,630,679 A | 12/1986 | Reeves, III et al. |
| 4,762,626 A | 8/1988 | Emmons et al. |
| 5,224,543 A | 7/1993 | Watkins et al. |
| 5,282,976 A | 2/1994 | Yeung |
| 5,342,540 A | 8/1994 | Perez |
| 7,192,907 B2 * | 3/2007 | Patel et al. .......... 507/222 |

OTHER PUBLICATIONS

Graham, G.M., et al., "The Impact of Dissolved Iron ..." Presented at the SPE International Symposium on Oilfield Chemistry, Houston, TX, Feb. 5-7, 2003 (SPE 80254).
Graham, G.M., et al., "The Importance of Appropriate Laboratory Procedures ..." Presented at the SPE Oilfield Scale Symposium, Aberdeen, U.K., Jan. 30-31, 2002 (SPE 74679).
Graham, G.M., et al., "Occurance, Prediction and Prevention of Zinc Sulfide Scale ..." Presented at the SPE Third International Symposium on Oilfield Scale, Aberdeen, U.K., Jan. 30-31, 2001 (SPE 68317).

* cited by examiner

*Primary Examiner*—George Suchfield
(74) *Attorney, Agent, or Firm*—Jones & Smith, LLP; John Wilson Jones

(57) ABSTRACT

A formulation containing a copolymer derived from a cationic monomer effectively inhibits and controls the formation of inorganic scales. The formulation has particular application in the removal of zinc sulfide and iron sulfide scales formed when zinc bromide brines are used as completion fluids. The copolymer exhibit high solubility in high-density brines, such as zinc bromide brines. The polymers may be introduced into an oil or gas well as a portion of a carrier fluid or with brine. The preferred copolymer for use in the invention contains an acrylamide unit and a diallyldimethylammonium salt and, optionally, an acrylic acid or a salt thereof. The weight average molecular weight of such inhibitor copolymers is generally between from about 500,000 to about 5,000,000.

25 Claims, No Drawings

SCALING INHIBITORS AND METHOD FOR USING THE SAME IN HIGH DENSITY BRINES

This application is a continuation application of U.S. patent application Ser. No. 10/671,156, filed on Sep. 25, 2003 now U.S. Pat. No. 7,159,655.

FIELD OF THE INVENTION

The invention relates to inhibitors for inorganic scales in oilfield applications. The copolymers and terpolymers of the invention have particular applicability in the inhibition and control of zinc sulfide, as well as iron sulfide, scales.

BACKGROUND OF THE INVENTION

Brines are widely used in well completion as a kill fluid, completion fluid, packer fluid or workover fluid, etc. Generally, a zinc bromide ($ZnBr_2$) brine will be used when a brine is required to have a density of about 14.0 ppg or above. Depending on the economic concern and the requirements of their properties, the zinc bromide fluids applied include $CaBr_2/ZnBr_2$ two-salt and $CaCl_2/CaBr_2/ZnBr_2$ three-salt brines. During completion of the well, however, such brines may become lost in the reservoir and remain in the formation for a long period of time. If a reservoir contains hydrogen sulfide ($H_2S$) gas, or sulfur-containing chemical was used during the completion of the wells, or a formation water contains sulfide ion, zinc sulfide (ZnS) or iron sulfide (FeS, $Fe_2S_3$, $FeS_2$) scales can form when a zinc bromide brine is commingled with sulfide ion and where soluble iron is available as a result of corrosion. The formation of zinc sulfide or iron sulfide scales can damage well productivity through a variety of associated problems such as 1) plugging of flow channels in the formation and across the perforation and 2) scaling on downhole tool assembles and surface facilities, etc.

To remove zinc sulfide or iron sulfide scales, an acid treatment is normally performed. After the acid treatment, the production rate returns to its previous level. However, new zinc sulfide or iron sulfide scale deposits will form in the well in a short period of time, and a re-treatment is required. This translates to increased costs. In addition, there are significant risks associated with acid treatments in high temperature, high-pressure gas wells. These include corrosivity of acid at high temperature and the generation of toxic $H_2S$ gas during the treatment.

To prevent the formation of zinc sulfide or iron sulfide scales, one preferred approach is to treat the zinc bromide brine with a zinc sulfide and iron sulfide scale inhibitor during well completion. There are several sulfide scale inhibitors on the market. These conventional sulfide scale inhibitors were originally developed for fresh water or low-density brines such as KCl, NaCl or $NH_4Cl$. These can be categorized into several families of chemicals such as phosphate esters, phosphonate/phosphonic acids, chelating agents, and polymeric inhibitors. Phosphonate/phosphonic acid type scale inhibitors have demonstrated their effectiveness to control ZnS scale at relatively low concentration. Polymeric scale inhibitors, such as sodium salt of acrylamido-methyl propane sulfonate/acrylic acid copolymer (AMPS/AA), phosphinated maleic copolymer (PHOS/MA) or sodium salt of polymaleic acid/acrylic acid/acrylamido-methyl propane sulfonate terpolymers (PMA/AMPS), are also effective scale inhibitors to control ZnS scale.

Although a chelating agent could be an effective scale inhibitor, its effectiveness is limited for application in brines since its loading is in direct proportion to $Zn^{2+}$ concentration. It is not practical to use a chelating agent in a completion brine that usually contains significant amount of $Zn^{2+}$ ions (could be as high as 15% $Zn^{2+}$). For the majority of the scale inhibitors mentioned above, especially for polymeric inhibitors, their solubility in high density completion brines is very limited due to the high concentration of $Zn^{2+}$ and $Ca^{2+}$ ions present in the brines and very limited free water available. The high concentrations of $Zn^{2+}$ and $Ca^{2+}$ ions are also very detrimental to the effectiveness of phosphonic based scale inhibitors. Furthermore, due to very limited free water in high-density brines, it is very difficult for a scale inhibitor to completely dissolve in the brine. During well completion operations, the completion brine is under constant circulation and filtration. Any scale inhibitor that is not totally soluble in the brine could be removed from the system and loses its effectiveness during the operation.

A need exists therefore to develop a ZnS or iron sulfide scale inhibitor that has good solubility in high-density brines and can effectively control ZnS or iron sulfide scaling.

SUMMARY OF THE INVENTION

Formation of inorganic scales may be inhibited and/or controlled in subterranean formations or in a wellbore by pumping downhole a copolymer comprising an acrylamide unit and a quaternary ammonium salt group, and optionally an acrylate.

A copolymer of an acrylamide unit and a diallyldimethylammonium salt and, optionally, an acrylic acid or acrylamide or a salt thereof provides very favorable results in the inhibition and/or control of inorganic scales. Such copolymers have particular applicability in the control and inhibition of zinc sulfide or iron sulfide scales, typically formed when zinc bromide brines are used as fluids in the treatment of a gas or oil well, such as a completion fluid.

The cationic nature of the copolymer greatly improves its compatibility for use as a scale inhibitor with high-density brines. In light of the presence of the cationic monomer, the polymers of the invention exhibit high solubility in high-density brines, such as zinc bromide brines.

DETAILED DESCRIPTION OF THE PREFERRED EMBODIMENTS

The polymer for use in the invention is a copolymer comprising an acrylamide unit and a quaternary ammonium salt group, and optionally an acrylate.

Examples of the quaternary ammonium salt used include those obtained by cationizing a tertiary-amino-containing monomer such as N,N-dimethylaminoethyl(meth)acrylate, N,N-diethylaminoethyl(meth)acrylate, N,N-dimethylaminopropyl(meth)acrylate, N,N-diethylaminopropyl(meth)acrylate, N,N-dimethylaminoethyl(meth)acrylamide, N,N-diethylaminoethyl(meth)acrylamide, N,N-dimethylaminopropyl(meth)acrylamide, N,N-diethylaminopropyl(meth)acrylamide, p-dimethylaminomethylstyrene, p-dimethylaminoethylstyrene, p-diethylaminomethylstyrene or p-diethylaminoethylstyrene with a cationizing agent, for example, a halogenated alkyl such as methyl chloride, methyl bromide or methyl iodide, a dialkylsulfuric acid such as dimethylsulfuric acid, an epichlorohydrin-added tertiary amine mineral acid salt such as N-(3-chloro-2-hydroxypropyl)-N,N,N-trimethylammonium chloride, an inorganic salt such as hydrochloric acid, hydrobromic acid, sulfuric acid or phosphoric acid, or a carboxylic acid such as formic acid, acetic acid or propionic acid.

Further preferred are dialkyldiallylammonium salts, polyvinyl benzyl trialkyl ammonium salts, salts of polyepichlorohydrin quaternized with trialkyl amine, polymethacrylamidoalkyltrialkyl ammonium salts, polymethacryloyloxyalkyltrialkyl ammonium salts, and polymethacryloyloxyalkyl dialkyl hydroxyalkyl ammonium salt wherein the alkyl is preferably a $C_1$-$C_3$ alkyl group. Preferred are polyvinyl benzyl trimethyl ammonium salts, salts of polyepichlorohydrin quaternized with trimethyl amine, polymethacrylamidopropyltrimethyl ammonium salts, polymethacryloyloxyethyltrimethyl ammonium salts, and polymethacryloyloxyethyl dimethyl hydroxyethyl ammonium salt.

Especially preferred as quaternary ammonium salt are dimethyldiallylammonium salts, such as dimethyldiallylammonium chloride, and derivatives from acrylamide or acrylic acid such as acrylamidoethyltrimethylammonium chloride, acrylamide/dimethylaminoethyl acrylate methyl chloride quaternary ammonium salt, poly(acrylamide/dimethylaminoethyl methacrylate methyl chloride quaternary ammonium salt), poly(acrylamide/diallyldimethyl ammonium chloride), poly(dimethylaminoethyl acrylate methyl chloride quaternary ammonium salt), and poly(dimethylaminoethyl methacrylate methyl chloride quaternary ammonium salt).

Suitable for use as the "acrylamide" unit could be acrylamide, (meth)acrylamide, diacetone acrylamide, and N-methylolacrylamide.

The molar ratio of acrylamide unit:quaternary ammonium salt in the copolymer is generally between from about 1:5 to about 5:1. In a preferred embodiment, the molar ratio of acrylamide:diallyldimethylammonium salt is about 1:2 to about 2:1. Such copolymers include the water-soluble polymers known as Polyquaternium-7. In a preferred embodiment, the copolymer is poly(acrylamide-co-diallyldimethylammonium chloride). The molecular weight of the copolymer and/or the terpolymers discussed below is typically between from about 500,000 to about 5,000,000. As used herein, unless stated to the contrary, "molecular weight" refers to weight average molecular weight.

In an alternative embodiment, the copolymer for use in the invention is a terpolymer of an acrylic acid, an acrylamide and quaternary ammonium salt. Suitable as use for the acrylate are acrylic acid, (meth)acrylic acid as well as a salt of acrylic acid or (meth)acrylic acid. Such salts include alkali salts, like sodium salts. The molar ratio of the acrylic acid or salt thereof (when present) and the acrylamide is typically between from about 2:1 to about 1:3, preferably 1:1. (As used herein, the term "copolymer" shall refer to a polymer containing at least two monomers or building blocks and shall include polymers composed of greater than two monomers or building blocks, such as terpolymers.) The molar ratio of the acrylamide unit:quaternary ammonium salt is between from about 1:5 to about 5:1. In a preferred embodiment, the weight ratio of the acrylic acid:quaternary ammonium salt:acrylamide unit is approximately from about 1:2:1 to about 1:1:1.

The copolymers of the invention may contain either random units of acrylamide, diallyldimethylammonium salt and, optionally, acrylic acid. Alternatively, the copolymer for use in the invention may be a block copolymer containing block segments of the monomer(s).

The polymers of the invention effectively inhibits, controls or treats deposited inorganic scale formations in subterranean formations, such as oil wells, gas wells and wellbores. As such, the polymers of the invention may be used to treat scales of calcium, barium, magnesium salts and the like, such as barium sulfate, calcium sulfate, and calcium carbonate scales. The copolymer has particular application in the treatment of zinc sulfide or iron sulfide scales.

The polymers of the invention are especially useful in fluids for the treatment of gas wells or oils wells. For example, the fluid may be a completion fluid or completion brine. Such fluids may contain a brine containing zinc bromide, calcium bromide calcium chloride, or a combination thereof or sodium bromide.

Thus, the copolymer as a scale inhibitor may be introduced into an oil well or gas well as part of a carrier fluid or as a component of the brine. The carrier fluid typically contains between from 0 to about 10 weight percent KCl, NaCl, or $NH_4Cl$ or another inorganic salt. The amount of copolymer present in the carrier fluid is typically between from about 15 ppm to about 100,000 ppm depending upon the severity of the scale deposition. When present with brine, the weight percentage of copolymer is generally between from about 0.02 to about 2 weight percent. Further, the scale inhibitor of the invention may be added directly to a fracturing fluid or an acidizing fluid, such as a matrix acidizing fluid.

The cationic nature of the copolymer, due to the presence of the cationic monomer, significantly enhances the solubility of the copolymer in brines especially high-density brines or brines with high salt concentration. Brine materials suitable for use in the invention are those that have a density in the range of from about 8.4 to about 22 lb./gal and preferably the density will be from about 14 to about 22 lb./gal. In a preferred embodiment, the copolymer for use in the invention is soluble in high density brines, such as zinc bromide brines which exhibit a density of 14.0 ppg or higher. The high-density brine materials can contain water-soluble salts other than zinc bromide. For instance, the brines may contain sodium salts such as sodium chloride, sodium bromide, etc, calcium salts such as calcium chloride, calcium bromide, etc. other zinc salts such as zinc chloride, zinc bromide, etc. and the like. The non-cationic monomer portion of the copolymer, such as an acrylamide unit and, optionally, acrylic acid or salts, principally serve in the function of scale inhibition.

The following examples will illustrate the practice of the present invention in its preferred embodiments. Other embodiments within the scope of the claims herein will be apparent to one skilled in the art from consideration of the specification and practice of the invention as disclosed herein. It is intended that the specification, together with the examples, be considered exemplary only, with the scope and spirit of the invention being indicated by the claims that follow.

EXAMPLES

All percentages expressed herein are in terms of weight percent unless otherwise noted. In each of the Examples below, either 0.5% or 1% (by volume) copolymer or terpolymer was used to treat the $ZnBr_2$ completion brines. For purposes of these examples, the term copolymer or terpolymer shall contain either "PADAC" [poly(acrylamide-co-diallyldimethylammonium chloride)] in a 5 weight percent solution in water or an "AADAC" [a terpolymer of acrylic acid, dimethyldiallylammonium chloride and acrylamide] in a 5 weight percent solution in water. To evaluate the effectiveness of formulated PADAC and AADAC, the following method was applied, and the results obtained are presented in Tables 1, 2 and 3.

A 3% sodium chloride brine was prepared. Sodium sulfide was added to sodium chloride brine to produce sulfur ion. A $ZnBr_2$ brine (either $CaBr_2/ZnBr_2$ or $CaCl_2/CaBr_2/ZnBr_2$) was then prepared. ZnS scale inhibitor was added to the $ZnBr_2$ brine. Sodium chloride brine and $ZnBr_2$ brine was mixed at a 1:1 volumetric ratio in a glass jar. The glass jar was placed in a 180° F. water bath. ZnS scaling tendency vs. time was then noted. Also, to evaluate the performance of the copolymer at higher temperatures, the glass jar was first placed in a pressure bomb, and the bomb was then pressurized with a 300 psi nitrogen gas and finally placed in an oven at 300° F. Zinc sulfide scaling was reported over a period of four hours. Examples 1-10 (Table 1, Testing at 180° F.) and 15-20 (Table 3, Testing at 300° F.) employed a copolymer containing PADAC. Examples 11-14 (Table 2, Testing at 180° F.) employed a terpolymer of AADAC.

TABLE 1

Scaling Tests at 180° F.

| Example | Mixtures | One-hour observation | Two-hour observation |
|---|---|---|---|
| 1 | 3% NaCl with 25 ppm sulfur: 17.4 ppg $CaBr_2/ZnBr_2$ | Slight Scaling | Scaling and flocculating |
| 2 | 3% NaCl with 25 ppm sulfur: 17.4 ppg $CaBr_2/ZnBr_2$ brine with 0.5% copolymer | No Scaling | No Scaling |
| 3 | 3% NaCl with 25 ppm sulfur: 15.5 ppg $CaBr_2/ZnBr_2$ brine with 1% copolymer | No Scaling | No Scaling |
| 4 | 3% NaCl with 25 ppm sulfur: 17.4 ppg $CaCl_2/CaBr_2/ZnBr_2$ | Slight Scaling | Scaling and flocculating |
| 5 | 3% NaCl with 25 ppm sulfur: 17.4 ppg $CaCl_2/CaBr_2/ZnBr_2$ brine with 0.5% copolymer | No Scaling | No Scaling |
| 6 | 3% NaCl with 25 ppm sulfur: 15.5 ppg $CaCl_2/CaBr_2/ZnBr_2$ brine with 1% copolymer | No Scaling | No Scaling |
| 7 | 3% NaCl with 50 ppm sulfur: 17.4 ppg $CaBr_2/ZnBr_2$ | Scaling | Scaling and flocculating |
| 8 | 3% NaCl with 50 ppm sulfur: 17.4 ppg $CaBr_2/ZnBr_2$ brine with 0.5% copolymer | No Scaling | No Scaling |
| 9 | 3% NaCl with 50 ppm sulfur: 17.4 ppg $CaCl_2/CaBr_2/ZnBr_2$ | Scaling | Scaling and flocculating |
| 10 | 3% NaCl with 50 ppm sulfur: 17.4 ppg $CaCl_2/CaBr_2/ZnBr_2$ brine with 0.5% copolymer | No Scaling | No Scaling |

TABLE 2

Scaling Tests at 180° F.

| Example | Mixtures | One-hour observation | Two-hour observation |
|---|---|---|---|
| 11 | 3% NaCl with 25 ppm sulfur: 17.4 ppg $CaBr_2/ZnBr_2$ | Slight Scaling | Scaling and flocculating |
| 12 | 3% NaCl with 25 ppm sulfur: 17.4 ppg $CaBr_2/ZnBr_2$ brine with 0.5% terpolymer | No Scaling | No Scaling |
| 13 | 3% NaCl with 25 ppm sulfur: 17.4 ppg $CaCl_2/CaBr_2/ZnBr_2$ | Slight Scaling | Scaling and flocculating |
| 14 | 3% NaCl with 50 ppm sulfur: 17.4 ppg $CaCl_2/CaBr_2/ZnBr_2$ brine with 0.5% terpolymer | No Scaling | No Scaling |

TABLE 3

Scaling Tests at 300° F.

| Example | Mixtures | Four-hour observation |
|---|---|---|
| 15 | 3% NaCl with 25 ppm sulfur: 16.5 ppg $CaCl_2/CaBr_2/ZnBr_2$ | Scaling |
| 16 | 3% NaCl with 25 ppm sulfur: 16.5 ppg $CaCl_2/CaBr_2/ZnBr_2$ with 0.5% copolymer | No Scaling |
| 17 | 3% NaCl with 25 ppm sulfur: 16.5 ppg $CaCl_2/CaBr_2/ZnBr_2$ with 1% copolymer | No Scaling |
| 18 | 3% NaCl with 50 ppm sulfur: 16.5 ppg $CaCl_2/CaBr_2/ZnBr_2$ | Scaling |
| 19 | 3% NaCl with 50 ppm sulfur: 16.5 ppg $CaCl_2/CaBr_2/ZnBr_2$ with 0.5% copolymer | No Scaling |
| 20 | 3% NaCl with 50 ppm sulfur: 16.5 ppg $CaCl_2/CaBr_2/ZnBr_2$ with 1% copolymer | No Scaling |

From the foregoing, it will be observed that numerous variations and modifications may be effected without departing from the true spirit and scope of the novel concepts of the invention.

What is claimed is:

1. A method for inhibiting or controlling inorganic scale formations in a subterranean formation or in a wellbore, comprising pumping downhole a copolymer comprising:
   quaternary ammonium salt; and
   an acrylamide unit
wherein the inorganic scale formations are scales of calcium, barium or magnesium salt.

2. The method of claim 1, wherein the quaternary ammonium salt is selected from the group consisting of dialkyldiallylammonium salt, polyvinyl benzyl trialkyl ammonium salts, salts of polyepichlorohydrin quaternized with trialkyl amine, polymethacrylamidopropyltrialkyl ammonium salts, polymethacryloyloxyethyltrialkyl ammonium salts, and polymethacryloyloxyethyl dialkyl hydroxyalkyl ammonium salt.

3. The method of claim 2, wherein the quaternary ammonium salt is a dialkyldiallylammonium salt.

4. The method of claim 3, wherein the dialkyldiallylammonium salt is a dimethyldiallylammonium salt.

5. The method of claim 4, wherein the dimethyldiallylammonium salt is dimethyldiallylammonium chloride.

6. The method of claim 5, wherein the acrylamide unit is acrylamide.

7. The method of claim 4, wherein the molar ratio of acrylamide unit:diallyldimethylammonium salt is between from about 1:5 to about 5:1.

8. The method of claim 7, wherein the molar ratio of acrylamide unit:diallyldimethylammonium salt is from about 1:1 to about 3:1.

9. The method of claim 2, wherein the quaternary ammonium salt is a polyvinyl benzyl trialkyl ammonium salt.

10. The method of claim 9, wherein the polyvinyl benzyl trialkyl ammonium salt is polyvinyl benzyl trimethyl ammonium salt.

11. The method of claim 1, wherein the acrylamide unit is selected from the group consisting of acrylamide, (meth)acrylamide, diacetone acrylamide or N-methylolacrylamide.

12. The method of claim 11, wherein the acrylamide unit is acrylamide.

13. The method of claim 1, wherein the copolymer is pumped downhole as a component of a carrier fluid.

14. The method of claim 1, wherein the copolymer is pumped downhole as part of a brine.

15. The method of claim 14, wherein the brine contains calcium bromide, zinc bromide, calcium chloride or a combination thereof or sodium bromide.

16. The method of claim 14, wherein the copolymer is soluble in a brine having a density greater than or equal to 14.0 lb/gal.

17. The method of claim 1, wherein the copolymer is pumped downhole as a component of a fracturing or acidizing fluid.

18. The method of claim 1, wherein the weight average molecular weight of the copolymer is between from about 500,000 to about 5,000,000.

19. The method of claim 1, wherein the copolymer further comprises an acrylic acid unit.

20. The method of claim 19, wherein the acrylic acid unit is acrylic acid, (meth)acrylic acid or a salt thereof.

21. The method of claim 19, wherein the copolymer is a terpolymer of acrylamide, diallyldimethylammonium salt and acrylic acid or a salt thereof and further wherein the weight ratio of acrylamide:diallyldimethylammonium salt:acrylic acid is about 1:1:1.

22. The method of claim 1, wherein the copolymer is a block or random copolymer.

23. The method of claim 22, wherein the copolymer is a block copolymer composed of blocks of polyacrylamide and polydiallyldimethylammonium salt and, optionally, blocks of polyacrylic acid or a sodium salt thereof.

24. The method of claim 22, wherein the copolymer is a random copolymer composed of units of acrylamide and diallyldimethylammonium salt and, optionally, acrylic acid or a sodium salt thereof.

25. The method of claim 1, wherein the inorganic scale formations are scales of barium sulfate, calcium sulfate or calcium carbonate

* * * * *